United States Patent
Isono

(10) Patent No.: US 11,312,196 B2
(45) Date of Patent: Apr. 26, 2022

(54) THREE-ROW WHEEL VEHICLE

(71) Applicant: Toyota Jidosha Kabushiki Kaisha, Toyota (JP)

(72) Inventor: Hiroshi Isono, Mishima (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/198,433

(22) Filed: Mar. 11, 2021

(65) Prior Publication Data
US 2021/0283965 A1   Sep. 16, 2021

(30) Foreign Application Priority Data

Mar. 13, 2020  (JP) .............................. JP2020-044417

(51) Int. Cl.
*B60G 7/00*     (2006.01)
(52) U.S. Cl.
CPC ...... *B60G 7/006* (2013.01); *B60G 2200/1322* (2013.01); *B60G 2300/07* (2013.01)
(58) Field of Classification Search
CPC ............ B60G 7/006; B60G 2200/1322; B60G 2300/07; B60G 5/01; B62D 61/10; B60Y 2200/48
See application file for complete search history.

(56) References Cited

U.S. PATENT DOCUMENTS

| | | | | |
|---|---|---|---|---|
| 3,105,700 A | * | 10/1963 | Hardman | B60G 5/01 280/685 |
| 3,219,360 A | * | 11/1965 | Schwab | B60G 5/01 280/680 |
| 3,315,977 A | * | 4/1967 | Small | B60G 5/01 280/677 |
| 3,351,037 A | * | 11/1967 | Meili | B60K 17/30 440/12.66 |
| 3,458,213 A | * | 7/1969 | Chaney | B60G 7/02 280/676 |
| 3,625,538 A | * | 12/1971 | Raidel | B60G 11/107 280/686 |

(Continued)

FOREIGN PATENT DOCUMENTS

| | | | | |
|---|---|---|---|---|
| GB | 887800 A | * | 1/1962 | ........... B62D 53/028 |
| JP | 55164513 A | * | 12/1980 | ............... B60G 5/01 |

(Continued)

*Primary Examiner* — Paul N Dickson
*Assistant Examiner* — Kurtis Nielson
(74) *Attorney, Agent, or Firm* — Dinsmore & Shohl LLP

(57) ABSTRACT

A three-row wheel vehicle having front, center and rear wheels has laterally spaced front pivot links each pivotably connected at a middle to a vehicle body, laterally spaced swing arms each swingably connected to a front end of the front pivot link and rotatably supports the front wheel at a lower end, laterally spaced rear pivot links each pivotably connected to the vehicle body at a middle and rotatably supports the rear wheel at a rear end, laterally spaced force transmission mechanisms each configured to convert a rearward force transmitted from the front wheel to the swing arm into an upward force and transmit the upward force to the front pivot link on a front side of the middle, and laterally spaced connecting links each pivotably attached to a rear end of the front pivot link and a front end of the rear pivot link.

4 Claims, 9 Drawing Sheets

(56) References Cited

U.S. PATENT DOCUMENTS

| | | | | |
|---|---|---|---|---|
| 3,756,619 A | * | 9/1973 | Thorsell | B60G 1/00 |
| | | | | 280/104 |
| 3,809,004 A | * | 5/1974 | Leonheart | B60F 3/0007 |
| | | | | 180/21 |
| 4,840,394 A | * | 6/1989 | Bickler | B60G 5/01 |
| | | | | 280/677 |
| 4,964,480 A | * | 10/1990 | Kopczynski | B60G 21/04 |
| | | | | 180/22 |
| 2004/0231904 A1 | * | 11/2004 | Beck | B64B 1/50 |
| | | | | 180/197 |
| 2020/0062324 A1 | * | 2/2020 | Ishikawa | B60G 3/20 |
| 2021/0284260 A1 | * | 9/2021 | Isono | B60G 5/04 |

FOREIGN PATENT DOCUMENTS

| | | | | |
|---|---|---|---|---|
| JP | 2006-190105 A | | 7/2006 | |
| JP | 2012-228996 A | | 11/2012 | |
| JP | 2014-234138 A | | 12/2014 | |
| JP | 2017-222297 A | | 12/2017 | |
| WO | WO-2019195911 A1 | * | 10/2019 | A61G 5/06 |

* cited by examiner

THREE-ROW WHEEL VEHICLE

CROSS-REFERENCE TO RELATED APPLICATION

This application claims priority to Japanese Patent Application No. JP2020-044417 filed on Mar. 13, 2020, the content of which is hereby incorporated by reference in its entirety into this application.

BACKGROUND

1. Technical Field

The present disclosure relates to a three-row wheel vehicle that has a front wheel group, a center wheel group and a rear wheel group and in which at least one of the front wheel group, center wheel group and rear wheel group includes a pair of wheels spaced laterally.

2. Description of the Related Art

As a self-propelled vehicle, various special vehicles with excellent traversability on rough terrain, steps, etc. are known. In order for a vehicle to travel on rough terrain, it is necessary for the wheels to have better performance over an protrusion or the like than a general vehicle such as an automobile. A vehicle such as a self-propelled trolley that transports luggage also needs to have excellent performance of wheels riding on a step, as in a case of riding on a sidewalk from a general road.

As a means for easily passing over a protrusion and climbing on a step, it is conceivable to raise a front wheel group when the front wheel group approaches a protrusion and a step. For example, in Japanese Patent Application Laid-open Publication No. 2012-228996, a vehicle having a front wheel, center wheels, and a rear wheel is described, which is configured so that the front wheel can easily be raised to pass over a protrusion or climb on a step by adjusting lengths of the links connecting the front wheel and the center wheels and an offset angle in the lateral direction of the links.

In the vehicle described in Japanese Patent Application Laid-open Publication No. 2012-228996, when the front wheel approaches a step or the like, the front wheel can be easily lifted, but since the front wheel is not actively raised, the front wheel cannot get over a step when a height of the step is high. Further, by adjusting the lengths of the links connecting the front wheel and the center wheels and the offset angle in the lateral direction of the links, a position of a center of gravity of the vehicle is inevitably changed, so that running stability of the vehicle tends to deteriorate.

SUMMARY

The present disclosure provides a three-row wheel vehicle which is improved so as to easily ride on a step or the like by effectively utilizing not only an upward force but also a rearward force received by a front wheel group from a step or the like to move the front wheel group upward.

According to the present disclosure, a three-row wheel vehicle is provided which has a front wheel group, a center wheel group and a rear wheel group that are arranged in a front-rear direction of the three-row wheel vehicle, and at least one of the front wheel group, the center wheel group and the rear wheel group includes a pair of laterally spaced wheel.

The three-row wheel vehicle has a pair of laterally spaced front pivot links, a pair of laterally spaced swing arms, a pair of laterally spaced rear pivot links, a pair of laterally spaced force transmission mechanisms and a pair of laterally spaced connecting links.

Each front pivot link that is connected at a middle portion to a vehicle body so as to pivot in a vertical direction around a first pivot axis; each swing arm is connected to a front end portion of the front pivot link so as to swing in a front-rear direction around a second pivot axis and rotatably supports the corresponding wheel of the front wheel group at a lower end portion; each rear pivot link is connected to the vehicle body so as to pivot in a vertical direction around a third pivot axis at a middle portion and rotatably supports the corresponding wheel of the rear wheel group at a rear end portion; each force transmission mechanism is configured to convert a rearward force transmitted from the corresponding wheel of the front wheel group to the swing arm into an upward force and transmit the upward force to the front pivot link on a front side of the first pivot axis; each connecting link is pivotably attached to a rear end portion of the front pivot link at a lower end portion and pivotably attached to a front end portion of the rear pivot link at an upper end portion, and each wheel of the center wheel group is rotatably supported by one of the front pivot link and the connecting link.

According to the above configuration, the three-row wheel vehicle has a pair of laterally spaced front pivot links, a pair of laterally spaced swing arms, a pair of laterally spaced rear pivot links, a pair of laterally spaced force transmission mechanisms and a pair of laterally spaced connecting links. Each front pivot link and each rear pivot link are connected to a vehicle body so as to pivot in a vertical direction around first and third pivot axes at middle portions, respectively. Each swing arm is connected to a front end portion of the front pivot link so as to swing in a front-rear direction around a second pivot axis, and rotatably supports the corresponding wheel of the front wheel group at a lower end portion. Each force transmission mechanism is configured to convert a rearward force transmitted from the corresponding wheel of the front wheel group to the swing arm into an upward force and transmit the upward force to the front pivot link on a front side of the first pivot axis. Each connecting link is pivotably attached to a rear end portion of the front pivot link at a lower end portion and pivotably attached to a front end portion of the rear pivot link at an upper end portion.

When the front wheel group reaches a step or the like, the front wheel group receives not only an upward force but also a rearward force from the step or the like. The upward force is transmitted to the front pivot link by the swing arm so that the front pivot link is pivoted around the first pivot axis so as to raise the front end portion. Further, the rearward force is converted into an upward force by the force transmission mechanism and transmitted to the front pivot link on a front side of the first pivot axis, so that this also causes the front pivot link to be pivoted around the first pivot axis so as to raise the front end portion.

Accordingly, as compared to where the force transmission mechanism configured as described above is not provided, the front pivot link can be efficiently pivoted around the first pivot axis so that its front end portion rises, and the front wheel group can be actively moved upward through the swing arm. Therefore, since the front wheel group can be moved upward by effectively utilizing not only the upward force received by the front wheel group from the step or the like but also a reaction force of the rearward force, the front wheel group can easily ride on the step or the like.

When the front pivot link pivots around the first pivot axis and its front end portion rises and its rear end portion descends, the descent of the rear end portion is transmitted by the connecting link to the front end portion of the rear pivot link to descend the front end portion. Therefore, the rear pivot link pivots around the third pivot axis so that its rear end portion rises, thus raising the rear wheel group. When the rear wheel group rises, the vehicle pivots so that its front end side rises around a ground contact point of the center wheel group. This also causes the front wheel group to move upward and the front wheel group to easily ride on a step or the like.

In particular, as will be described in detail later, when a height of a step or the like is equal to or larger than a radius of the front wheel, the upward force becomes 0 and only the rearward force is applied. Even in such a situation, the front wheel can be moved upward by the above-mentioned action of the force transmission mechanism and rising of the rear wheel. Therefore, even if the height of the step or the like is equal to or larger than the radius of the front wheel, the front wheel can ride on the step or the like as long as the height is not too excessive.

Even if the front pivot link and the rear pivot link and the like are pivoted when the front wheel ride on a step or the like, a center of gravity of the vehicle does not substantially change in the front-rear direction or the lateral direction, so that running stability of the vehicle does not deteriorate.

In one aspect of the present disclosure, each wheel of the center wheel group is rotatably supported below the first pivot axis by the front pivot link.

According to the above aspect, there is no need for a dedicated link to rotatably support the center wheel. In addition, since the front pivot link rotatably supports the center wheel below the first pivot axis, when the center wheel is in a situation of riding on a step and a rearward force acts on the center wheel, the front pivot link receives a moment in the direction of lowering the front end portion around the first pivot axis. Therefore, the front pivot link tries to push down the swing arm and the front wheel downward, but if the front wheel has already climbed on the step, it does not descend, so that the center wheel is lifted by a reaction force of the moment. Therefore, the center wheel can be easily driven onto a step.

Further, in another aspect of the present disclosure, a rotation axis of each wheel of the center wheel group is located directly below the first pivot axis when the three-row wheel vehicle is on a horizontal flat traveling road.

According to the above aspect, when the front pivot link pivots around the first lateral pivot axis, the rotation axis of the center wheel moves around the first lateral pivot axis, so that a height of the center wheel rises slightly and does not descend. Therefore, even if a load of the three-row wheel vehicle is high and a ground contact load of each wheel is high, it is possible to avoid hindering the pivotal movement of the front pivot link due to an increase in a force with which the center wheel pushes the traveling road downward.

Further, in another aspect of the present disclosure, each connecting link has a trailing arm portion, each wheel of the center wheel group is rotatably supported around a rotation axis by a rear end portion of the trailing arm portion, and the rotation axis of each wheel of the center wheel group is located below and behind a pivot axis of the lower end portion of the connecting link and a pivot axis of the upper end portion of the connecting link.

According to the above aspect, when the front wheel rides on a step, the front pivot link pivots around the first pivot axis, and the rear end portion of the front pivot link and the connecting link descend, the center wheel also descends. The rear wheel rises as the rear pivot link pivots around the third pivot axis so that its front end portion descends and the rear end portion rises. Therefore, the three-row wheel vehicle pivots so that the front end portion rises around a ground contact point of the lowered center wheel until the raised rear wheel touches the traveling road, so that the front wheel can efficiently ride on the step.

In the present application, all terms indicating the positional relationship and direction between members such as "front", "rear", "front and back", "forward", "rearward", and "lateral" mean front, rear, front-back, forward, rearward, and lateral directions about the vehicle unless otherwise specified. Further, in the present application, a pair of front wheels, a pair of center wheels and a pair of rear wheels are collectively referred to as a front wheel group, a center wheel group and a rear wheel group, respectively, as necessary.

Other objects, other features and attendant advantages of the present disclosure will be readily understood from the description of the embodiments of the present disclosure described with reference to the following drawings.

DETAILED DESCRIPTION

The present disclosure will now be described in detail with respect to the embodiments referring to the accompanying drawings.

First Embodiment

The three-row wheel vehicle 10 according to the first embodiment and the other embodiment described later is configured as a self-propelled carrier, and includes a support plate 12 that supports a load (not shown) to be transported in a mounted state, and a vehicle body frame 14 fixed to a lower surface of the support plate 12. The support plate 12 and the vehicle body frame 14 constitute a vehicle body. The three-row wheel vehicle 10 of the present disclosure may be applied to a vehicle such as an auto-driving vehicle which moves with passengers being on board.

Figure 1:
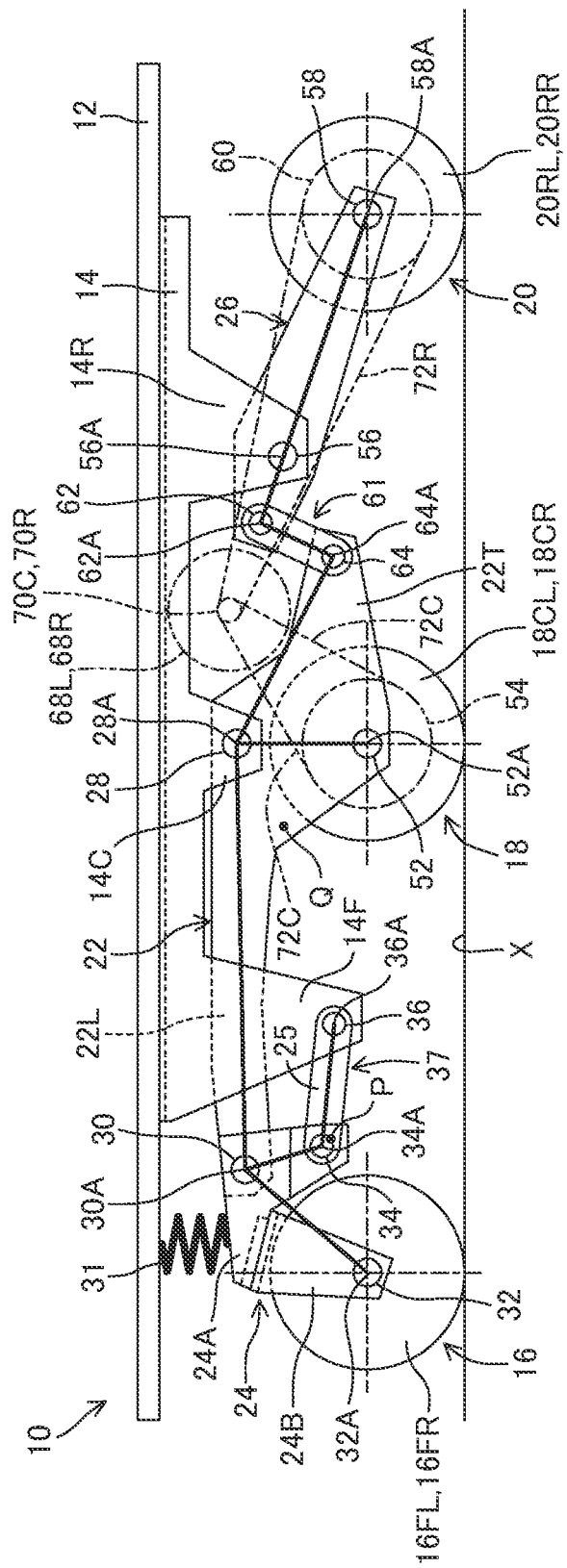
FIG. 1 is a side view showing a first embodiment of a three-row wheel vehicle according to the present disclosure when viewed in the lateral direction of the vehicle.

As shown in FIG. 1, the vehicle 10 has a pair of front wheels 16FL and 16FR, a pair of center wheels 18CL and 18CR, and a pair of rear wheels 20RL and 20RR, which are laterally spaced from each other, respectively. The wheels respectively constitute a front wheel row, a center wheel row and a rear wheel row. In the following description, the front wheels 16FL and 16FR, the center wheels 18CL and 18CR, and the rear wheels 20RL and 20RR are collectively referred to as a front wheel group 16, a center wheel group 18, and a rear wheel group 20, respectively, as necessary. Although not shown in FIGS. 1 and 2, the front wheels 16FL, 16FR and the rear wheels 20RL, 20RR are omni wheels that are movable not only in the front-rear direction of the vehicle 10 but also in the lateral direction and an oblique front-rear direction. The center wheels 18CL, 18CR each may consist of a supporting wheel integrated with an axle and a hollow or solid tire supported on a rim of the supporting wheel. The front wheels 16FL, 16FR and the rear wheels 20RL, 20RR may be composed of supporting wheels and tires like the center wheels 18CL, 18CR, and may be supported so as to change a rolling direction.

The vehicle 10 has a pair of front pivot links 22, a pair of swing arms 24, a pair of rear pivot links 26 arranged behind the pair of front pivot links 22, a pair of force transmission mechanisms 37 and a pair of connecting links 61. Each pair of the members is laterally spaced from each other. Each front pivot link 22 has a leading arm portion 22L and a trailing arm portion 22T, and is connected at an intermediate portion to a center bracket 14C of the vehicle body frame 14 so as to pivot in the vertical direction around a first pivot axis 28A by a pivot shaft 28.

Each leading arm portion 22L functions as a leading arm connected to the vehicle body frame 14 so as to pivot in the vertical direction around the first pivot axis 28A at a rear end portion. On the other hand, each trailing arm portion 22T functions as a trailing arm connected to the vehicle body frame 14 so as to pivot in the vertical direction around the first pivot axis 28A at a front end portion. Although not shown in FIG. 1, each pivot shaft 28 may be fixed to one of the vehicle body frame 14 and the front pivot link 22 and supported by the other of the vehicle body frame and the front pivot link via a bearing or a bush.

<Front Wheels>

Each swing arm 24 is connected at an upper end portion to a front end portion of the leading arm portion 22L so as to swing in the front-rear direction around a second pivot axis 30A extending in the lateral direction by a pivot shaft 30, and rotatably supports the corresponding front wheel 16 at a lower end portion. In the first embodiment shown, each swing arm 24 comprises a main arm 24A and a sub arm 24B. A compression coil spring 31 is mounted between the main arm 24A and the vehicle body frame 14 on the front side of the pivot shaft 30.

Each main arm 24A is composed of a yoke-shaped upper portion that opens upward and is located on both sides of the front end portion of the leading arm portion 22L, and a flat plate-shaped lower portion that is integrated with the upper portion and extends downward from the upper portion. Each pivot shaft 30 may be fixed to one of the front end portion of the leading arm portion 22L and the main arm 24A, and may be supported by the other of the front end portion of the leading arm portion 22L and the main arm 24A via a bearing or a bush.

Each sub arm 24B has a main portion having a downwardly open yoke shape located on both sides of the corresponding front wheel 16, and is integrally connected to the main arm 24A at an upper end portion by welding or the like. Each front wheel 16 has an axle 32, and each sub arm 24B supports the axle 32 rotatably around a rotation axis 32A at a lower end portion via a bearing or a bush. The rotation axis 32A extends laterally at a position forward and downward with respect to the second pivot axis 30A.

In the first embodiment shown, a shock absorbing device (not shown) is provided between a point P on the main arm 24A of the swing arm 24 and a point Q on the leading arm portion 22L. The shock absorbing device is a member in which a shock absorber and a compression coil spring are integrally incorporated, like a MacPherson strut, and may be adapted to cushion an impact input to the front wheels 16 and attenuate a vibration. The shock absorbing device may be arranged at a position other than between the points P and Q.

In the first embodiment, the main arm 24A of each swing arm 24 is connected to a front bracket 14F of the vehicle body frame 14 by a connecting link 25. Each connecting link 25 is pivotably attached at a front end portion to a lower end portion of the main arm 24A of the swing arm 24 so as to pivot around a pivot axis 34A extending in the lateral direction by a pivot shaft 34. Further, each connecting link 25 is pivotably attached at a rear end portion to the front bracket 14F so as to pivot around a fourth pivot axis 36A extending in the lateral direction by a pivot shaft 36. As shown in FIG. 1, the pivot axis 34A is located below the second pivot axis 30A, and in a situation where the vehicle 10 is on a horizontal flat road, the pivot axis 36A is located rearward and slightly below the pivot axis 34A.

<First and Second Force Transmission Paths>

Figure 2:
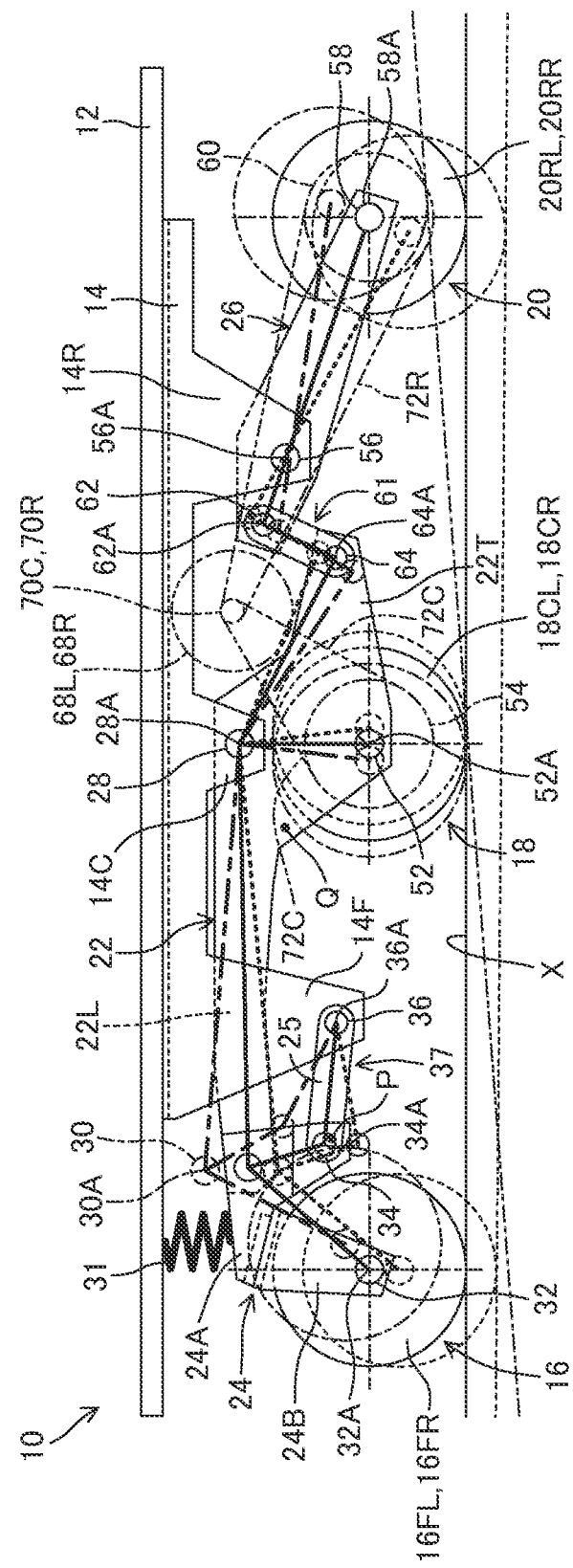
FIG. 2 is a skeleton diagram showing positions of a swing arm and the like when front wheels are in a neutral position (solid line), a bound position (dashed line) and a rebound position (broken line) in the three-row wheel vehicle shown in FIG. 1.

In FIGS. 1 and 2, straight lines connecting the pivot shafts of the front pivot link 22 and the like form a skeleton diagram in which the front pivot link 22 and the like are replaced with straight links. As can be seen from the skeleton diagram, the sub arm 24B of each swing arm 24 cooperates with the main arm 24A to constitute a first force transmission path that transmits a mainly upward force received by the corresponding front wheel 16FL or 16FR from a traveling road X to the front end portion of the leading arm portion 22L.

When a rearward force acts from the front wheel 16FL or 16FR to the front end portion of the connecting link 25 via the swing arm 24, the swing arm 24 and the connecting link 25 cooperate with each other to transmit a reaction force including an upward component to the swing arm. Therefore, the swing arm 24 and the connecting link 25 cooperate with each other to constitute a second force transmission path that converts a part of the rearward force received by the front wheel 16FL or 16FR from the traveling road X into an upward force and transmits it to the front end portion of the leading arm portion 22L.

<Center Wheels>

The leading arm portion 22L of each front pivot link 22 cantileverly supports an axle 52 at a lower end of the rear end portion, and each axle 52 supports the center wheel 18CL or 18CR rotatably around a laterally extending rotation axis 52A via a bearing or a bush. The rotation axis 52A extends laterally below the first pivot axis 28A. The center wheels 18CL and 18CR each has a chain sprocket 54 that is integrated with the axle 52. Each center wheel 18 has a chain sprocket 54 that is integrated with the axle 52. In the first embodiment and the second and third embodiments described later, the rotation axis 52A is located directly below the first pivot axis 28A in a situation where the vehicle 10 is on a horizontally flat traveling road X.

<Rear Wheels>

Each rear pivot link 26 is connected at an intermediate portion to a rear bracket 14R of the vehicle body frame 14 so as to pivot in the vertical direction around a lateral third pivot axis 56A by a pivot shaft 56. The rear wheels 20RL and 20RR each has an axle 58, which is supported via a bearing or a bush rotatably around a rotation axis 58A extending laterally by a rear end portion of the sub pivot link 26. The rear end portion of the rear pivot link 26 has a main portion having a downwardly open yoke shape located on both sides of the corresponding rear wheel 20RL or 20RR. The rear wheels 20RL and 20RR each has a chain sprocket 60 that is integrated with the axle 58.

A front end portion of each rear pivot link 26 is connected to a rear end portion of the trailing arm portion 22T of the front pivot link 22 by a connecting link 61. Each connecting link 61 is pivotably attached at an upper end portion to a front end portion of the corresponding rear pivot link 26 by a pivot shaft 62 so as to pivot around a lateral pivot axis 62A. Further, each connecting link 61 is pivotably attached at a lower end portion to a rear end portion of the corresponding trailing arm portion 22T so as to pivot around a lateral pivot axis 64A by a pivot shaft 64.

<Driving Force>

The vehicle body frame 14 is equipped with an electric motor 68L for driving the left center wheel 18CL and the left rear wheel 20RL, and an electric motor 68R for driving the right center wheel 18CR and the right rear wheel 20RR. A chain sprocket 70C for driving the center wheel 18 and a chain sprocket 70R for driving the rear wheel 20 are attached to an output shaft of each electric motor. A chain 72C is wound around the chain sprocket 54 of the corresponding center wheel 18CL or 18R and the chain sprocket 70C for driving the center wheel. Similarly, a chain 72R is wound around the chain sprocket 60 of the corresponding rear wheel 20RL or 20RR and the chain sprocket 70R for driving the rear wheel.

As will be described in detail later, when the front wheel 16FL or 16FR bounces and rebounds, the rotation axis 52A of the corresponding center wheel 18CL or 18CR swings around the first pivot axis 28A, so that a distance between the chain sprockets 54 and 70C changes. Further, when the rear wheel 20RL or 20RR bounces and rebounds, the rotation axis 58A of the rear wheel 20RL or 20RR swings around the pivot axis 56A that is located at a position different from the axis of the chain sprocket 70R for driving the corresponding rear wheel, so that a distance between the chain sprockets 60 and 70R changes. Therefore, although not shown in FIGS. 1 and 2, tensioners are provided on the chains 72C and 72R to reduce tension fluctuations in the chains due to changes in the distances between the chain sprockets.

<Braking Force>

A braking force may be applied to the center wheel group 18 and the rear wheel group 20 by generating torque in the direction opposite to the rotation direction during forward traveling by the electric motors 68L and 68R. Further, a braking device (not shown in FIGS. 1 and 2) may be provided, and braking forces may be applied to all or a part of the left and right wheels of the front wheel group 16, the center wheel group 18, and the rear wheel group 20 by the braking device.

<Traveling>

As can be seen from the above description, in the first embodiment and the second embodiment described later, the front wheels 16FL and 16FR are driven wheels, and the center wheels 18CL and 18CR and the rear wheels 20RL and 20RR are driving wheels. When outputs of the electric motors 68L and 68R are controlled to be the same, driving forces of the left and right center wheels 18CL, 18CR and the rear wheels 20RL, 20RR are the same, so that the vehicle 10 moves forward or backward in a straight line.

On the other hand, when the output of the left electric motor 68L is controlled to be higher than the output of the right electric motor 68R, the driving forces of the left center wheel 18CL and the left rear wheel 20RL become higher than the driving forces of the right center wheel 18CR and the right rear wheel 20RR, and the vehicle 10 moves forward by turning right or moves backward by turning left. On the contrary, when the output of the right electric motor 68R is controlled to be higher than the output of the left electric motor 68L, the driving forces of the right center wheel 18CR and the right rear wheel 20RR become higher than the driving forces of the left center wheel 18CL and the left rear wheel 20RL, and the vehicle 10 moves forward by turning left or moves backward by turning right.

Further, when the left center wheel 18CL and the left rear wheel 20RL are driven forward and the right center wheel 18CR and the right rear wheel 20RR are driven backward, the vehicle 10 turns right with a small turning radius or turns right substantially without moving. Conversely, when the right center wheel 18CR and the right rear wheel 20RR are driven forward and the left center wheel 18CL and the left rear wheel 20RL are driven backward, the vehicle 10 turns left with a small turning radius or turn left substantially without moving.

<Force that the Front Wheel Group Receives from a Step>

Figure 3:
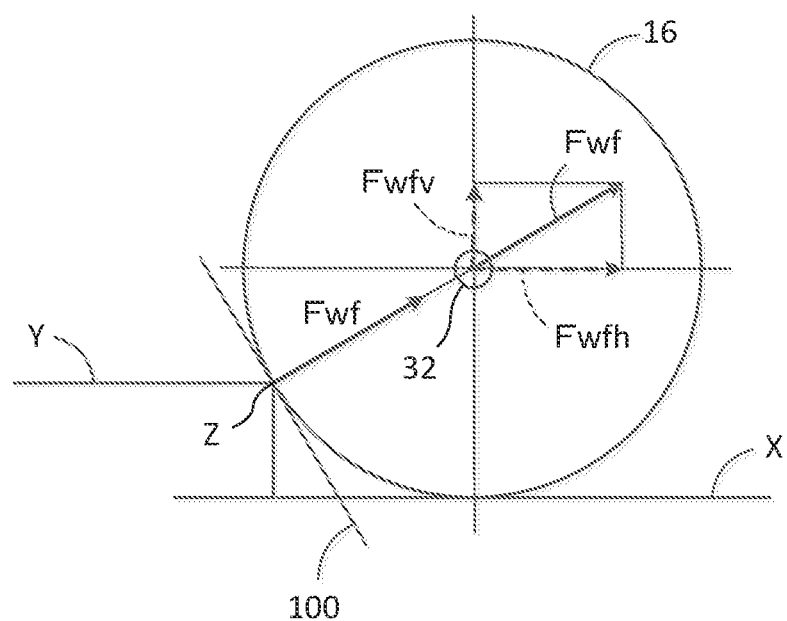
FIG. 3 is a diagram illustrating a situation in which an external force Fwf acts on the front wheel group and is transmitted to an axle of the front wheel group when the front wheel group reaches a step and is pressed against a corner of the step.

As shown in FIG. 3, if the front wheel group 16 reaches a step Y and is pressed against a corner Z of the step, for example, when the vehicle 10 moves from a general road to a sidewalk and travels, an external force Fwf perpendicular to a normal 100 at the corner Z acts on the front wheels 16FL and 16FR, and the external force Fwf is transmitted to the axle 32 via the front wheels. Therefore, a vertical component Fwfv of the external force Fwf acts on the axle 32 as an upward force, and a horizontal component Fwfh of the external force Fwf acts as a rearward force. The external force Fwf, and thus the vertical component, that is, the upward force Fwfv and the horizontal component, that is, the rearward force Fwfh, increases as the driving force of the vehicle 10 increases. The higher a height of the step Y, the smaller the upward force Fwfv and the larger the rearward force Fwfh. When the height of the step Y is equal to or greater than a radius of the front wheels 16FL and 16FR, the upward force Fwfv becomes 0, and the rearward force Fwfh becomes a value equal to the external force Fwf.

<Riding of the Front Wheel Group on a Step>

When the front wheel group 16 rides on a step Y, an upward force Fwfv and a rearward force Fwfh act on the axle 32 as described above.

Therefore, as shown in FIG. 2, the axle 32 tends to move upward and backward. Therefore, since the upward force Fwfv is transmitted to the front end portion of the leading arm portion 22L via the above-mentioned first force transmission path, the leading arm portion 22L is pivoted upward around the pivot axis 28A. Further, the rearward force Fwfh is transmitted to the connecting link 25 and an upward force is transmitted to the front end portion of the leading arm portion 22L via the above-mentioned second force transmission path, which also pivot the leading arm portion 22L upward around the pivot axis 28A.

When the leading arm portion 22L pivots upward around the pivot axis 28A, the front pivot link 22 pivots clockwise around the pivot axis 28A. Therefore, the trailing arm portion 22T descends, and its motion is transmitted to the front end portion of the rear pivot link 26 by the connecting link 61, so that the rear pivot link pivots counterclockwise around the pivot axis 56A. Notably, in the present specification, the "clockwise direction" and the "counterclockwise direction" are the directions of rotation when the vehicle 10 is viewed laterally from the left side, unless otherwise specified.

Therefore, as shown by the dashed line in FIG. 2, the rear wheel group 20 rises while the center wheel group 18 is in contact with the traveling road X. Since rearward and upward forces act on the front wheel group 16, the vehicle 10 pivots clockwise around ground contact points of the center wheel group 18, so that the front wheel group 16 rises relative to the center wheel group 18 and can easily climb on the step Y.

When the front pivot link 22 is pivoted clockwise around the pivot axis 28A, the trailing arm portion 22T is pivoted clockwise around the pivot axis 28A, so that the axle 52 moves slightly forward. In this connection, the center wheels 18CL and 18CR can roll forward around the rotation axis 52A. Therefore, the fact that the trailing arm portion 22T is provided integrally with the leading arm portion 22L does not prevent the front pivot link 22 from pivoting clockwise around the pivot axis 28A.

<Riding of the Center Wheel Group on the Step>

When the vehicle 10 travels and the center wheel group 18 rides on the step Y, a rearward force Fwfh acts on the axle 52 of the center wheel group 18, and the front pivot link 22 receives a counterclockwise moment around the pivot axis 28A as seen in FIGS. 1 and 2. Therefore, the leading arm portion 22L tries to push down the swing arm 24 and the front wheel group 16 downward, but the front wheel group 16 is already on the step Y and does not descend, so that the center wheel group 18 is lifted by a reaction force of the moment. Therefore, the center wheel group 18 can also easily ride on the step Y. Even when the front wheel group 16 has passed over a protrusion and the like instead of the step and are at the same height positions as the center wheel group 18 and the rear wheel group 20, the front wheel group 16 does not descend, so that the center wheel group 18 is lifted by the reaction force of the moment.

<Riding of the Rear Wheel Group on the Step>

When the vehicle 10 further travels and the front wheel group 16 and the center wheel group 18 have already climbed onto the step Y, if the center of gravity of the vehicle 10 is on or in front of the rotation axis 52A of the center wheel group 18, the vehicle 10 is in a horizontal posture. Therefore, since the rear wheel group 18 rises from the traveling road X, it can easily ride on the step Y.

Further, if the center of gravity of the vehicle 10 is behind the rotation axis 52A of the center wheel group 18, the vehicle is tilted rearward and the front wheel group 16 is in a state of being lifted from the step Y. When the rear wheel group 18 reaches the step Y and receives an upward force from the step, the rear pivot link 26 pivots counterclockwise around the pivot axis 56A, and a downward movement of the front end portion of the rear pivot link 26 is transmitted to the rear end portion of the front pivot link 22 by the connecting link 61 and the front pivot link 22 is pivoted clockwise around the pivot axis 28A.

Since the front pivot link 22 receives a spring force of the compression coil spring 31 at the front end portion, it receives a torque that limits the pivotal motion, and the torque is transmitted to the front end portion of the rear pivot link 26 via the connecting link 61. As a result, the front end portion of the rear pivot link 26 receives an upward force as a whole, and the upward force is transmitted to the vehicle body frame 14 via the pivot shaft 56, so that the vehicle 10 is pivoted counterclockwise around the ground contact point of the center wheel group 18. Therefore, the rear wheel group 20 is lifted from the traveling road X and can easily ride on the step Y.

<Getting of the Front Wheel Group Off the Step>

When the front wheel group 16 gets off the step Y, as shown by the dashed line in FIG. 2, the front wheel group 16 rebounds and the front pivot link 22 pivots around the pivot axis 28A in the counterclockwise direction as seen in FIGS. 1 and 2. However, since the height of the center wheel group 18 does not substantially change, the center wheel group 18 and the rear wheel group 20 maintain a state of being in contact with the step Y. Therefore, the front wheel group 16 can easily get off the step Y, and the vehicle 10 can continue traveling with the support plate 12 maintaining the horizontal posture.

<Getting of the Center Wheel Group Off the Step>

When the center wheel group 18 gets off the step Y, the height of the center wheel group 18 gradually decreases, so that the support plate 12 tends to lower forward. Therefore, the leading arm portion 22L receives an upward force from the front wheel group 16 via the swing arm 24. However, the swing arm 24 receives a clockwise moment around the pivot axis 30A as seen in FIGS. 1 and 2, and this moment exerts a downward force on the leading arm portion 22L via the second force transmission path. Accordingly, the front pivot link 22 does not substantially pivot. Therefore, the center wheel group 18 can easily get off the step Y without the support plate 12 suddenly falling forward.

<Getting of the Rear Wheel Group Off the Step>

When the front wheel group 16 and the center wheel group 18 have completed getting off the step and only the rear wheel group 20 is on the step Y, the rear pivot link 26 is in a state of being pivoted counterclockwise around the pivot axis 56A and as a result, the rear wheel group 20 is in a bound state. Accordingly, the rear pivot link 26 is urged clockwise by the compression coil spring 31 around the pivot axis 56A via the front pivot link 22 and the connecting link 61 so as to return the vehicle 10 to the position when traveling horizontally. Therefore, when the rear wheel group 20 gets off the step Y, the rear wheel group 20 descends while rolling around the corner Z of the step Y, and the rear pivot link 26 pivots clockwise around the pivot axis 56A, so that the rear wheel group 20 can easily get off the step Y.

Second Embodiment

Figure 4:
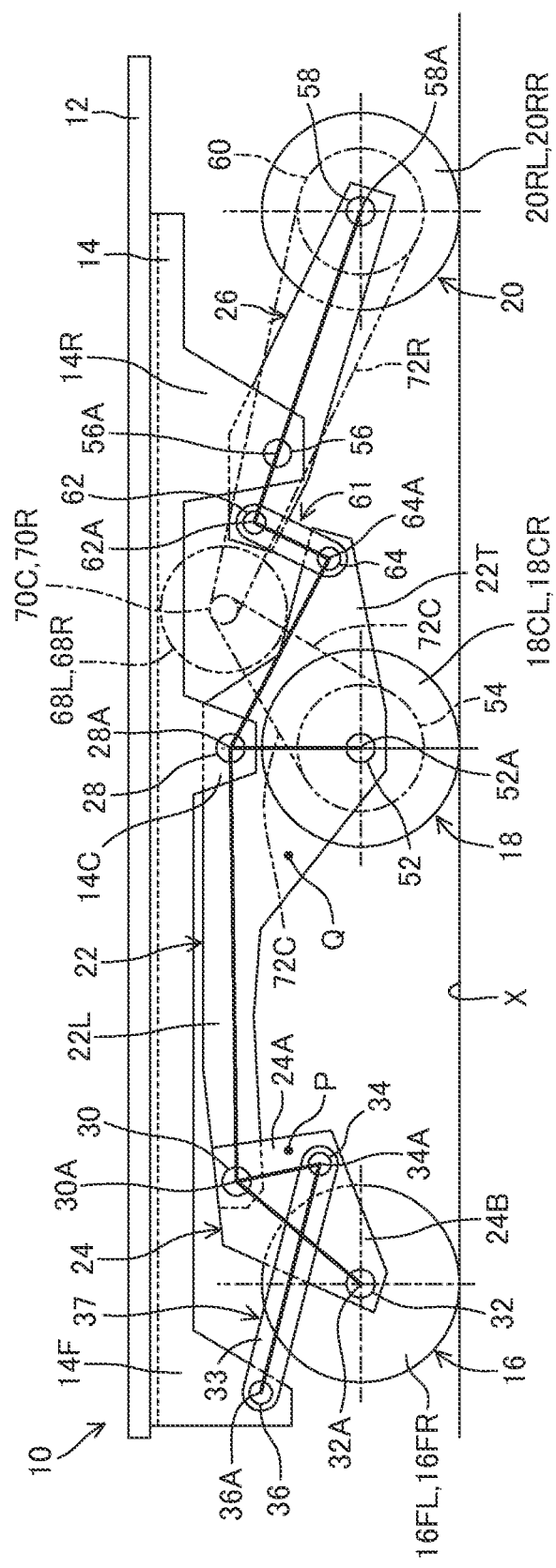
FIG. 4 is a side view showing a second embodiment of the three-row wheel vehicle according to the present disclosure when viewed in the lateral direction of the vehicle.
Figure 5:
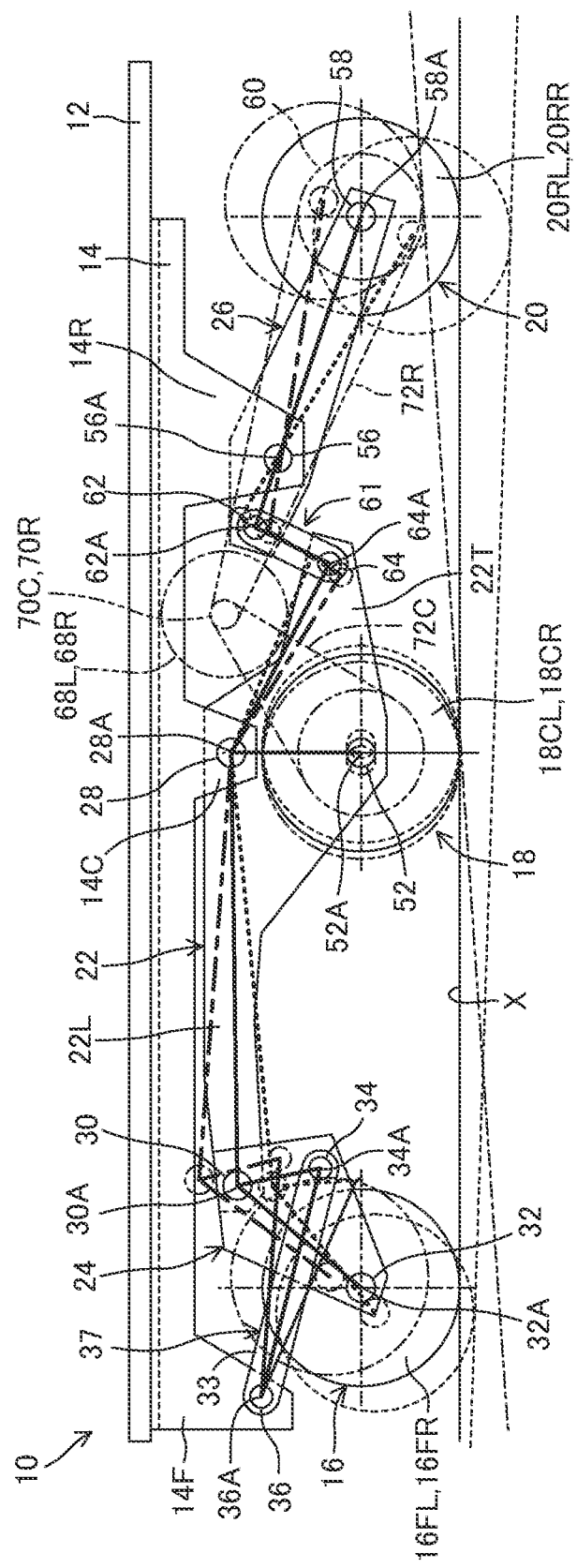
FIG. 5 is a skeleton diagram showing the positions of the swing arm and the like when the front wheel group is in the neutral position (solid line), the bound position (dashed line), and the rebound position (broken line) in the three-row wheel vehicle shown in FIG. 4.

The three-row wheel vehicle 10 according to the second embodiment shown in FIGS. 4 and 5 also has a pair of front pivot links 22, a pair of swing arms 24, a pair of rear pivot links 26, a pair of force transmission links 37 and a pair of connecting links 61. Each pair of the members is laterally spaced apart from each other. In addition, in FIGS. 4 and 5, the members corresponding to the members shown in FIGS.

1 and 2 are given the same reference numerals as those given in FIGS. 1 and 2. This also applies to FIGS. 6 to 9 described later.

Also in the second embodiment, the main arm 24A of the swing arm 24 is connected to the front bracket 14F of the vehicle body frame 14 by the connecting link 33. However, the connecting link 33 is pivotably attached at the rear end portion to the lower end portion of the main arm 24A of the swing arm 24 so as to pivot around the pivot axis 34A extending in the lateral direction by a pivot shaft 34. Further, the connecting link 33 is pivotably attached at the front end portion to the front bracket 14F of the vehicle body frame 14 so as to pivot around the pivot axis 36A extending in the lateral direction by a pivot axis 36. As shown in FIG. 4, the pivot axis 34A is located below the second pivot axis 30A, and the pivot axis 36A is located anterior to and above the pivot axis 34A when the vehicle 10 is on a horizontal flat road.

Although not shown in FIGS. 4 and 5, a compression coil spring may be mounted between the main arm 24A and the vehicle body frame 14 or the support plate 12 on the front side of the pivot shaft 30. As can be seen from the comparison between FIGS. 4 and 5 and FIGS. 1 and 2, the other points of the second embodiment are configured in the same manner as the first embodiment described above.

Also in the second embodiment, the sub arm 24B of the swing arm 24 cooperates with the main arm 24A to constitute the first force transmission path which transmits the upward force received by the front wheel 16 from the traveling road X to the front end portion of the leading arm portion 22L. Further, the swing arm 24 and the connecting link 33 cooperate with each other to constitute the second force transmission path which converts the rearward force received by the front wheel 16 from the traveling road X into an upward force and transmits it to the front end portion of the leading arm portion 22L.

Therefore, according to the second embodiment, as in the first embodiment described above, the front wheel group 16, the center wheel group 18, and the rear wheel group 20 can easily ride on a step Y and can easily get off the step Y. In particular, even if the height of the step is the same as or slightly larger than the radius of the front wheels 16FL and 16FR, the front wheels can ride on the step.

Third Embodiment

Figure 6:
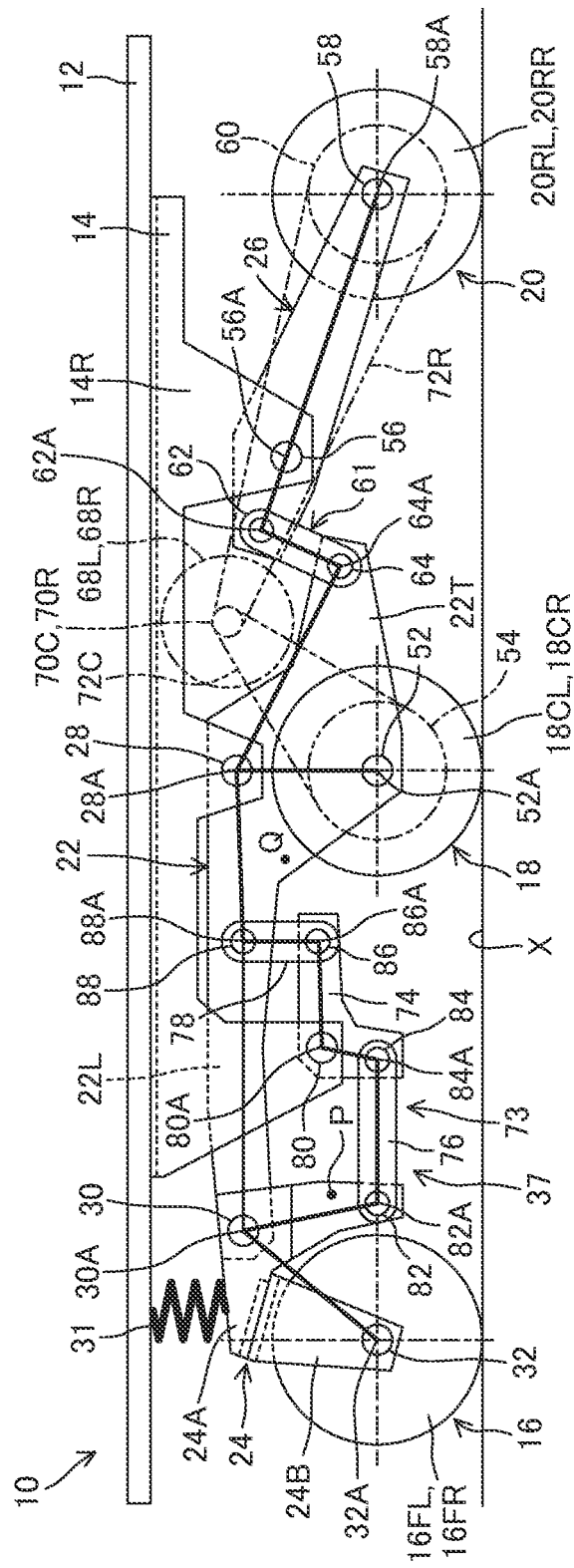
FIG. 6 is a side view showing a third embodiment of the three-row wheel vehicle according to the present disclosure when viewed in the lateral direction of the vehicle.
Figure 7:
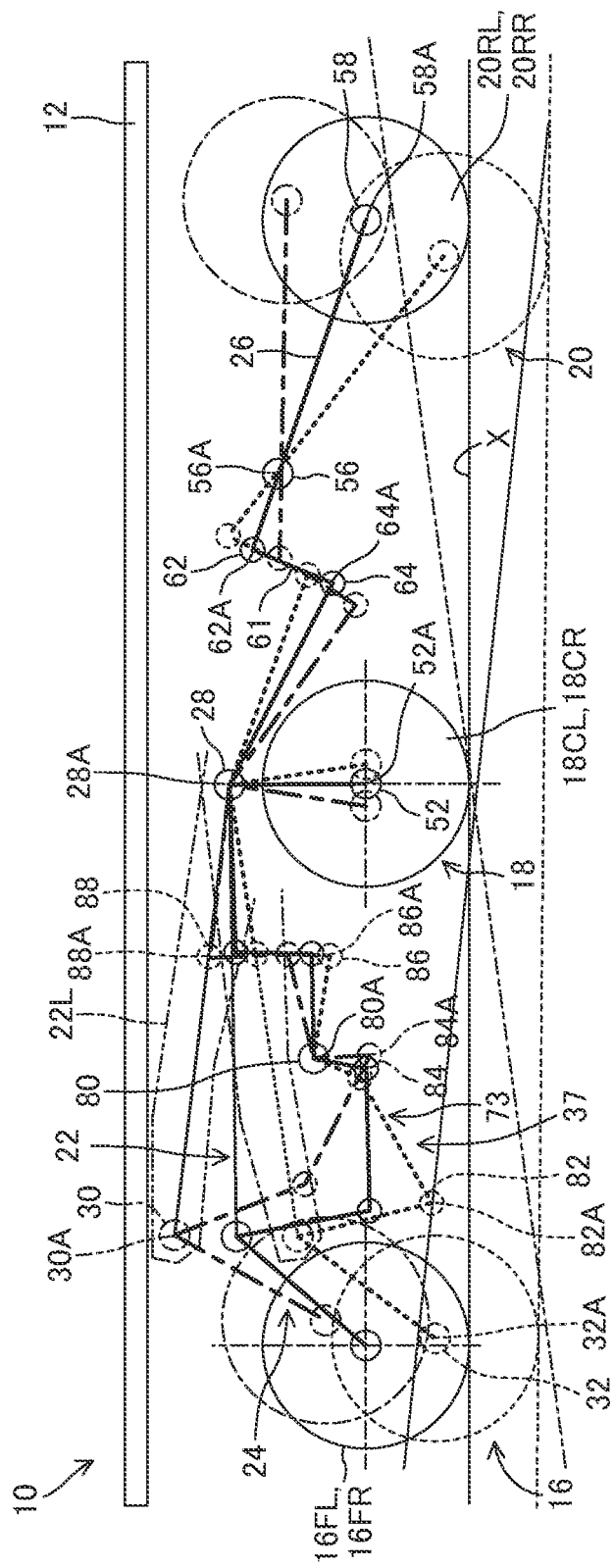
FIG. 7 is a skeleton diagram showing the positions of the swing arm and the like when front wheels are in a neutral position (solid line), a bound position (dashed line) and a rebound position (broken line) of the front wheels in the three-row wheel vehicle shown in FIG. 6.

The three-row wheel vehicle 10 according to the third embodiment shown in FIGS. 6 and 7 also has a pair of front pivot links 22, a pair of swing arms 24, a pair of rear pivot links 26, a pair of force transmission mechanisms 37 and a pair of connecting links 61. Each pair of the members is laterally spaced apart from each other. In the third embodiment, no connecting link 25 is provided, and each force transmission mechanism 37 includes a link mechanism 73 disposed between the front pivot link 22 and the swing arm 24.

<Link Mechanism>

Each link mechanism 73 includes a pivot link 74, a horizontal link 76, and a vertical link 78, and is configured to convert a rearward force transmitted from the front wheel 16FL or 16FR to the swing arm 24 into an upward force and transmit it to the front pivot link 22 at a position in front of the first axis 28A.

Each pivot link 74 is pivotably supported by the body frame 14 around a lateral pivot axis 80A by a pivot shaft 80, and is substantially L-shaped with first and second arm portions extending downward and posteriorly from the pivot shaft 80, respectively. The pivot shaft 80 may be fixed to one of the body frame 14 and the pivot link 74 and may be supported by the other of the body frame 14 and the pivot link 74 via a bearing or a bush.

Each horizontal link 76 is pivotably attached at a front end portion to a lower end portion of the sub arm 24B of the swing arm 24 by a pivot shaft 82 so as to pivot around a lateral pivot axis 82A. Further, the horizontal link 76 is pivotably attached at a rear end portion to a lower end portion of the first arm portion of the pivot link 74 by a pivot shaft 84 spaced below the pivot axis 80A so as to pivot around a lateral pivot axis 84A. Therefore, the pivot axis 84A is a first pivot point that pivotably attaches the rear end portion of the horizontal link 76 to the lower end portion of the first arm portion of the pivot link 74.

The pivot shaft 82 may be fixed to one of the lower end portion of the sub arm 24B of the swing arm 24 and the front end portion of the horizontal link 76, and may be supported by the other of the lower end portion of the sub arm 24B and the front end portion of the horizontal link 76 via a bearing or bush. Similarly, the pivot shaft 84 may be fixed to one of the lower end portion of the first arm portion of the pivot link 74 and the rear end portion of the horizontal link 76, and may be supported by the other of the rear end portion of the first arm portion of the pivot link 74 and the lower end portion of the horizontal link 76 via a bearing or a bush.

Each vertical link 78 is pivotably attached at a lower end portion to the rear end portion of the second arm portion of the pivot link 74 by a pivot shaft 86 located posteriorly from the pivot shaft 80A so as to pivot around a laterally extending pivot axis 86A. Therefore, the pivot axis 86A is a second pivot point that pivotably attaches the lower end portion of the vertical link 78 to the rear end portion of the second arm portion of the pivot link 74. Further, the vertical link 78 is pivotably attached at an upper end portion to the front pivot link 22 on the front side of the first pivot axis 28A so as to pivot around a lateral pivot axis 88A by a pivot shaft 88.

The pivot shaft 86 may be fixed to one of the rear end portion of the second arm portion of the pivot link 74 and the lower end portion of the vertical link 78, and may be supported by the other of the rear end portion of the second arm portion of the pivot link 74 and the lower end portion of the vertical link 78 via a bearing or a bush. Similarly, the pivot shaft 88 may be fixed to one of the front pivot link 22 and the upper end portion of the vertical link 78 and may be supported by the other of the front pivot link 22 and the upper end portion of the vertical link 78 via a bearing or a bush.

<First and Second Force Transmission Paths>

In FIGS. 6 and 7, straight lines connecting the pivot shafts of the front pivot link 22 and the like form a skeleton diagram in which the front pivot link 22 and the like are replaced with straight links. As can be seen from the skeleton diagram, the sub arm 24B of each swing arm 24 cooperates with the main arm 24A to constitute a first force transmission path that transmits a mainly upward force received by the corresponding front wheel 16FL or 16FR from a traveling road X to the front end portion of the front pivot link 22.

The swing arm 24, the pivot link 74, the horizontal link 76, and the vertical link 78 cooperate with each other to convert a horizontal displacement of the horizontal link 76 into a vertical displacement of the vertical link 78. Therefore, the swing arm 24 and the link mechanism 73 cooperate with each other to constitute a second force transmission path that converts a rearward force received by the front wheel 16 from the traveling path X into an upward force and transmits the force between the front end portion and the rear end portion of the front pivot link 22.

The other points of the third embodiment are configured in the same manner as in the first and second embodiments described above. Therefore, according to the third embodiment, as in the first and second embodiments, the front wheel group 16, the center wheel group 18, and the rear wheel group 20 can easily ride on a step Y and can easily descend the step Y. In particular, even if a height of the step is the same as or slightly larger than the radius of the front wheel group 16, the front wheel group can ride on the step.

Fourth Embodiment

Figure 8:
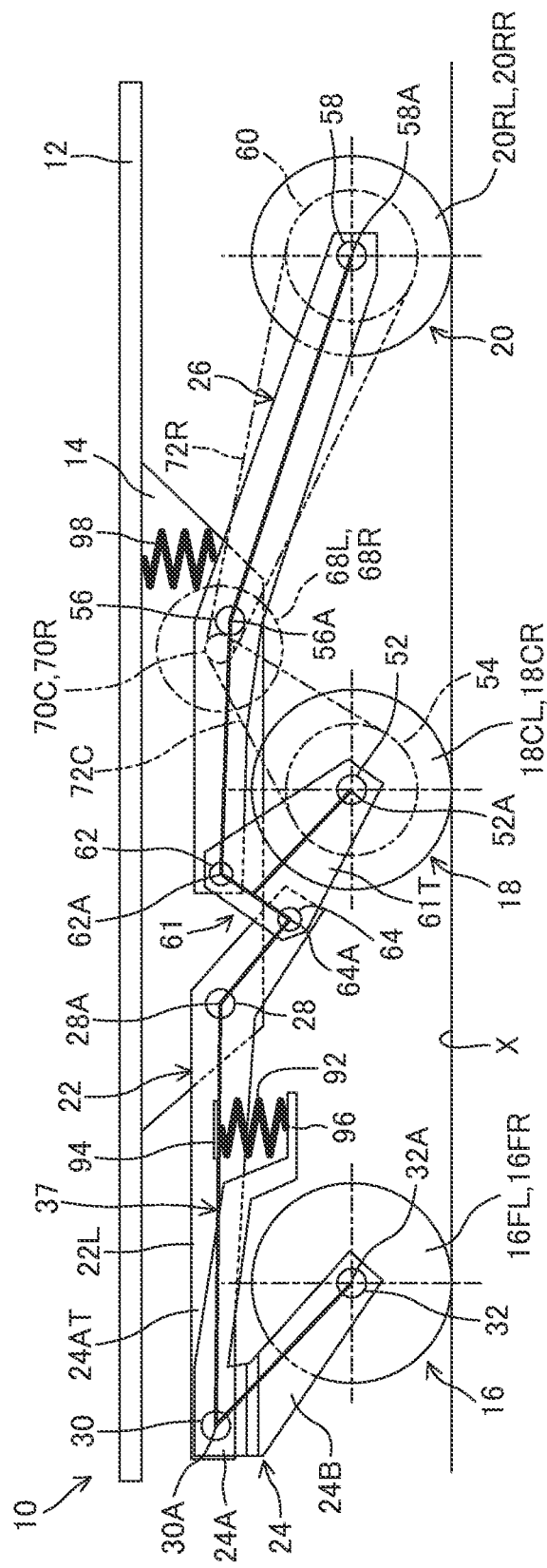
FIG. 8 is a side view showing a fourth embodiment of the three-row wheel vehicle according to the present disclosure when viewed in the lateral direction of the vehicle.
Figure 9:
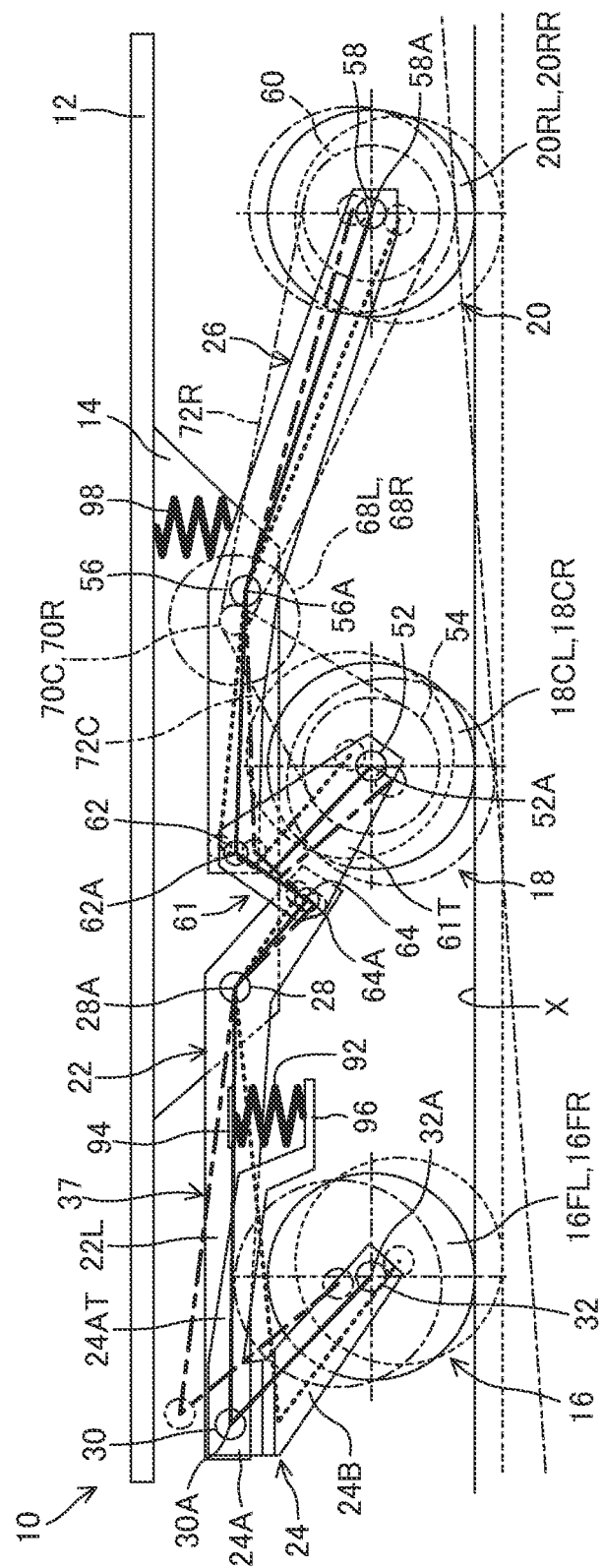
FIG. 9 is a skeleton diagram showing the positions of the swing arm and the like when front wheels are in a neutral position (solid line), a bound position (dashed line) and a rebound position (broken line) of the front wheels in the three-row wheel vehicle shown in FIG. 8.

The three-row wheel vehicle 10 according to the fourth embodiment shown in FIGS. 8 and 9 also has a pair of front pivot links 22, a pair of swing arms 24, a pair of rear pivot links 26, a pair of force transmission links 37 and a pair of connecting links 61. Each pair of the members is laterally spaced apart from each other. In the fourth embodiment, no connecting link 25 and no link mechanism 37 is provided, and a compression coil spring 92 is arranged between the front pivot link 22 and the swing arm 24.

In the fourth embodiment, the main arm 24A of each swing arm 24 has a trailing arm portion 24AT extending rearward and slightly downward with respect to the pivot shaft 30. The compression coil spring 92 is mounted between an upper seat 94 provided on the leading arm portion 22L of the front pivot link 22 and a lower seat 96 provided on a rear end portion of the trailing arm portion 24AT.

When the front wheel 16FL or 16FR bounces by receiving an upward force and a backward force and the swing arm 24 pivots counterclockwise around the axis 30A, the compression coil spring 92 is compressed, so that the spring force is transmitted as an upward force to the leading arm portion 22L of the front pivot link 22. Therefore, the trailing arm portion 24AT, the compression coil spring 92, and the like cooperate with each other to constitute a second force transmission path that converts a part of the rearward force received by the front wheel 16FL or 16FR from the traveling road X into an upward force and transmits it to the leading arm portion 22L.

Each connecting link 61 has a trailing arm portion 61T. The trailing arm portion 61T cantileverly supports the axle 52 at a lower end of the rear end portion, and the axle 52 rotatably supports the corresponding center wheel 18CL or 18CR around a lateral rotation axis 52A via a bearing or a bush. The rotation axis 52A is located below and behind the pivot axes 36A and 62A.

A compression coil spring 98 is arranged between the rear pivot link 26 and the support plate 12 behind the pivot shaft 56. The other points of the fourth embodiment are configured in the same manner as in the first to third embodiments described above.

According to the fourth embodiment, similar to the first to third embodiments, the front wheel group 16, the center wheel group 18, and the rear wheel group 20 can easily ride on a step Y and can easily descend the step Y. In particular, even if a height of the step is the same as or slightly larger than a radius of the front wheel group 16, the front wheel group can ride on the step.

<Effects Common to the First to Fourth Embodiments>

As can be seen from the above description, according to the first to fourth embodiments described above, the upward force Fwfv received by the front wheel group 16 from the step Y is transmitted to the front end portion of the leading arm portion 22L via the first force transmission path described above. Further, the rearward force Fwfh received by the front wheel group 16 from the step Y is converted into an upward force via the above-mentioned second force transmission path and transmitted to the leading arm portion 22L. Therefore, as compared to where second force transmission path configured as described above is not provided, the leading arm portion 22L can be efficiently pivoted upward around the rear end portion, so that the front wheel group 16 can be positively moved upward via the swing arm 24. Therefore, the front wheel group can be moved upward by effectively utilizing not only the upward force received by the front wheels 16FL and 16FR from the step Y or the like but also the rearward force, so that the front wheels can easily ride on the step or the like.

Even though the leading arm portion 22L and the like pivot when the front wheel group 16 rides on the step Y or the like, the center of gravity of the vehicle 10 does not substantially change in the front-rear direction or the lateral direction, so that the running stability of the vehicle does not deteriorate.

Further, as described above, the higher a height of a step Y, the smaller a vertical component, that is, an upward force Fwfv, and the larger the horizontal component, that is, a rearward force Fwfh. Therefore, in a conventional vehicle in which each front wheel is supported by a caster and a conventional vehicle in which each front wheel is supported by a trailing arm, the front wheel cannot ride on a step when a height of the step is high.

On the other hand, according to the first to fourth embodiments, for example, even if a height of a step Y is the same as or slightly larger than a radius of the front wheels 16FL and 16FR, the rearward force Fwfh received by the front wheel group 16 from the step is transmitted to the leading arm portion 22L via the second force transmission path. Therefore, the leading arm portion 22L is pivoted upward around the pivot axis 28A, and the front wheel group 16 is lifted upward via the swing arm 24. Therefore, even if the height of the step is the same as or slightly larger than the radius of the front wheels 16FL and 16FR, the front wheels can ride on the step.

Further, according to the first to fourth embodiments, the rear end portion of the front pivot link 22 is connected to the front end portion of the rear pivot link 26 by the connecting link 61. When the front pivot link 22 is pivoted so that the front wheel group 16 is raised, the rear wheel group 20 is lifted by the pivot of the rear pivot link 26, whereby the vehicle 10 pivots around the ground contact point of the lowered center wheel group 18 until the raised rear wheel group 20 touches the ground. Therefore, as described above, the front wheel group 16 can be effectively raised by the rearward inclination of the vehicle 10 as compared to where the rear wheel group 20 is not lifted, so that the front wheel group 16 can be effectively driven onto the step.

Further, according to the first to fourth embodiments, the electric motor 68L for driving the center wheel 18CL and the rear wheel 20RL on the left side and the electric motor 68R for driving the center wheel 18CR and the rear wheel 20RR on the right side are provided. Therefore, the number of electric motors can be reduced and the control of the electric motors can be facilitated as compared to where dedicated electric motors are provided for the center wheels 18CL, 18CR and the rear wheels 20RL, 20RR on the left and right sides.

Further, a driving force difference can be applied between the left wheels 18CL, 20RL and right wheels 18CR, 20RR of the center wheel group 18 and the rear wheel group 20, and a driving force can be applied to one of the left wheels 18CL, 20RL and right wheels 18CR, 20RR and a braking force can be applied to the other of the left and right wheels so that the vehicle 10 can turn. By controlling the difference in driving force and the difference in braking force, it is possible to control the turning direction and turning radius of the vehicle 10 without steering the wheels. Further, since a steering device for steering the wheels is not required, the structure of the vehicle 10 can be simplified as compared to where a steering device is provided.

Further, according to the first to fourth embodiments, the two rows of wheels, i.e., the center wheel group 18 and the rear wheel group 20, are the driving wheels. Therefore, when any of the front wheel group 16, the center wheel group 18, and the rear wheel group 20 rides on a step, even if one of the center wheel 18 and the rear wheel 20 rises from a traveling road X, the other of the center wheel group 18 and the rear wheel group 20 generates a driving force, so that the vehicle 10 can travel without any trouble.

In particular, according to the first to third embodiments, the trailing arm portions 22T supporting the center wheel group 18 each is integral with the rear end portion of the leading arm portion 22L. As described above, when the center wheel group 18 rides on the step Y and a rearward force Fwfh acts on the axle 52 of the center wheel group 18, the leading arm portion 22L and the trailing arm portion 22T receives a counterclockwise moment around the pivot axis 28A as seen in FIGS. 1 and 2, for example. Accordingly, the leading arm portion 22L tries to push down the swing arm 24 and the front wheel group 16, but the front wheel group 16 is already on the step Y and does not descend, so that the center wheel group 18 is lifted by a reaction force of the moment. Therefore, the center wheel group 18 can be easily driven onto the step Y.

Further, according to the first to third embodiments, when the vehicle 10 is on the horizontal traveling road X, the rotation axis 52A is located directly below the first pivot axis 28A. Thus, when the front pivot link 22 pivots around the first pivot axis 28A, the rotation axis 52A moves around the first pivot axis 28A, so that a height of the center wheel group 18 does not descend but rises slightly. Therefore, even if a load of the vehicle 10 is high and a ground contact load of each wheel is high, it is possible to avoid inhibition of the pivot of the front pivot link 22 due to an increased force of the center wheel group 18 pushing the traveling road X downward.

Further, according to the fourth embodiment, each connecting link 61 has a trailing arm portion 61T, and the trailing arm portion 61T rotatably supports the corresponding wheel of the center wheel group 18 around the rotation axis 52A at the lower end of the rear end portion. The rotating axis 52A is located below and behind the pivot axes 64A and 62A.

Thus, as shown in FIG. 9, when the front wheel group 16 rides on a step Y, the front pivot link 22 pivots around the first pivot axis 28A, and the rear end portion of the connecting link 61 descends, the center wheel group 18 also descends. Further, since the rear pivot link 26 pivots around the third pivot axis 56A so that its front end portion descends and the rear end portion rises, the rear wheel group 20 also rises. Therefore, the vehicle 10 pivots so that the front end portion of the vehicle rises around the ground contact point of the lowered center wheel group 18 until the raised rear wheel group 20 touches the ground, and therefore, as compared with the first to third embodiments, the front wheel can be efficiently driven onto the step Y.

Although the present disclosure has been described in detail with reference to specific embodiments, it will be apparent to those skilled in the art that the present disclosure is not limited to the above-described embodiments, and various other embodiments are possible within the scope of the present disclosure.

For example, in the above-described first to fourth embodiments, as described above, the front wheel group 16, the center wheel group 18, and the rear wheel group 20 are each composed of a pair of wheels that are laterally spaced apart from each other. However, at least one of the front wheel 16, the center wheel group 18, and the rear wheel group 20 may be composed of a pair of wheels that are laterally spaced from each other in the vehicle 10. That is, a wheel group or groups other than at least one of the wheel groups may each has one wheel arranged in the center in the lateral direction. Further, although the front wheel group 16, the center wheel group 18, and the rear wheel group 20 have the same diameter, the diameters of the respective wheel group may be different from each other.

Further, in the above-described first to fourth embodiments, the center wheel group 18 and the rear wheel group 20 are driven by the common drive source, but the center wheel group 18 and the rear wheel group 20 may be driven by a dedicated electric motor, respectively. The drive source may be any drive device other than the electric motor, and a driving force may be transmitted by any driving force transmission member other than the chain. The driving wheel may be an in-wheel motor type wheel incorporating an electric motor and reduction gears. Further, the driving wheels may be at least one of the front wheel group 16, the center wheel group 18, and the rear wheel group 20, and all of these wheel groups may be driving wheels.

Further, in the above-described first to fourth embodiments, the driving wheels are the center wheel group 18 and the rear wheel group 20, and the turning of the vehicle 10 is performed by applying a driving force difference between the left and right wheels of the center wheel group 18 and the rear wheel group 20, or by applying a driving force to one of the left and right wheels and a braking force to the other of the left and right wheels. However, the turning of the vehicle 10 may be performed by controlling the driving force difference or the braking force difference of any driving wheels. Further, the turning of the vehicle 10 may be performed by steering at least one of the front wheel group 16 and the rear wheel group 20, or may be performed by controlling the driving force difference or braking force difference of any wheel group and steering at least one of the front wheel group and the rear wheel group.

Further, in the above-described first to fourth embodiments, the center wheel group 18 is supported by the trailing arm portion 22T integrally provided with the leading arm portion 22L, and as described above, the center wheel group 18 can also easily ride on the step. However, the trailing arm portion 22T may be omitted and the center wheel group 18 may be supported by other support structures known in the art, such as a trailing arm.

What is claimed is:

1. A three-row wheel vehicle having a front wheel group, a center wheel group and a rear wheel group that are arranged in a front-rear direction of the three-row wheel vehicle, and at least one of the front wheel group, the center wheel group and the rear wheel group includes a pair of laterally spaced wheels, wherein the three-row wheel vehicle has a pair of laterally spaced front pivot links, a pair of laterally spaced swing arms, a pair of laterally spaced rear pivot links, a pair of laterally spaced force transmission mechanisms and a pair of laterally spaced connecting links, and wherein each front pivot link is connected at a middle portion to a vehicle body so as to pivot in a vertical direction around a first pivot axis; each swing arm is connected to a front end portion of the front pivot link so as to swing in a front-rear direction around a second pivot axis and rotatably supports the corresponding wheel of the front wheel group at a lower end portion; each rear pivot link is connected to the vehicle body so as to pivot in a vertical direction around a third pivot axis at a middle portion and rotatably supports the corresponding wheel of the rear wheel group at a rear end portion; each force transmission mechanism is configured to convert a rearward force transmitted from the corresponding wheel of the front wheel group to the swing arm into an upward force and transmit the upward force to the front pivot link on a front side of the first pivot axis; each connecting link is pivotably attached to a rear end portion of the front pivot link at a lower end portion and pivotably attached to a front end portion of the rear pivot link at an upper end portion, and each wheel of the center wheel group is rotatably supported by one of the front pivot link and the connecting link.

2. The three-row wheel vehicle according to claim 1, wherein each wheel of the center wheel group is rotatably supported below the first pivot axis by the front pivot link.

3. The three-row wheel vehicle according to claim 2, wherein a rotation axis of each wheel of the center wheel group is located directly below the first pivot axis when the three-row wheel vehicle is on a horizontal flat traveling road.

4. The three-row wheel vehicle according to claim 1, wherein each connecting link has a trailing arm portion, each wheel of the center wheel group is rotatably supported around a rotation axis by a rear end portion of the trailing arm portion, and the rotation axis of each wheel of the center wheel group is located below and behind a pivot axis of the lower end portion of the connecting link and a pivot axis of the upper end portion of the connecting link.

* * * * *